Patented Nov. 28, 1944

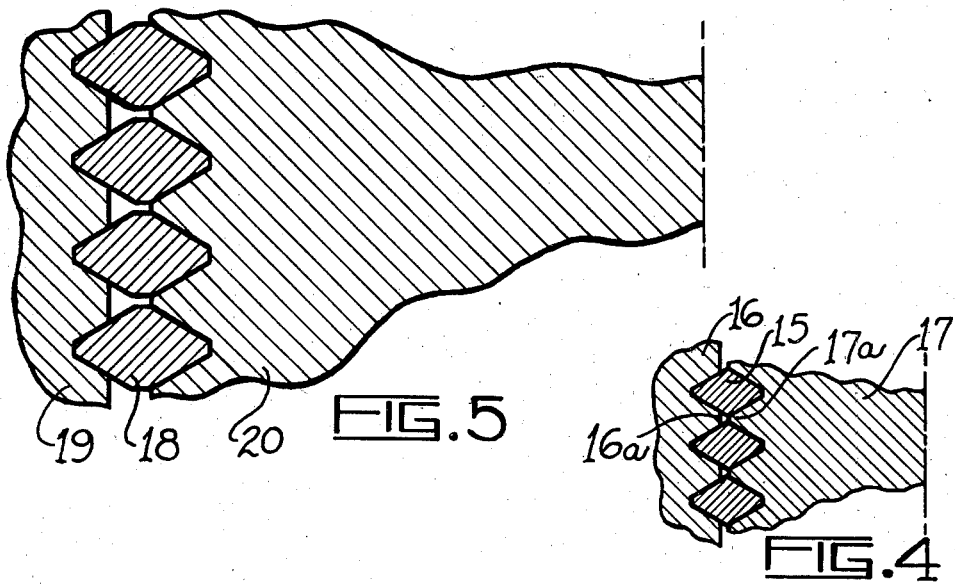
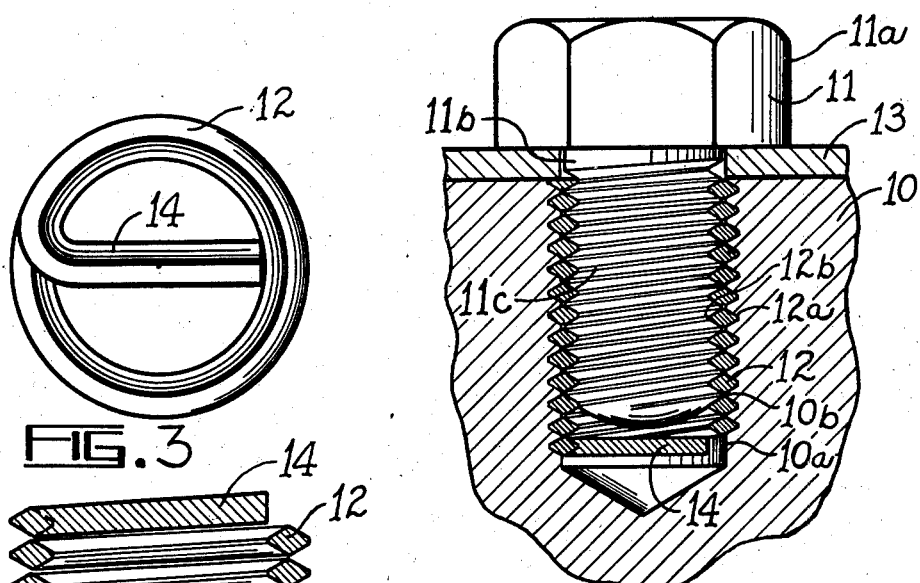
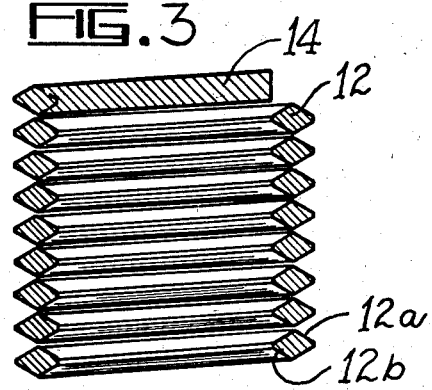

2,363,662

UNITED STATES PATENT OFFICE 2,363,662

THREADED CONNECTION AND INSERT

Howard J. Findley, Shaker Heights, Ohio, assignor to Eaton Manufacturing Company, Cleveland, Ohio, a corporation of Ohio Application August 13, 1943, Serial No. 498,493

1 Claim. (Cl. 85—46)

This invention relates to threaded connections and to a connecting member or insert for use in making threaded connections.

The invention aims to provide a novel form of threaded connection and insert in which a helically coiled wire forms a connection between a pair of members having external and internal threads of a conventional American National form thereon and wherein the wire is of a cross-sectional shape such that it has corresponding internal and external threads of said conventional American National form thereon. This novel insert makes it possible to obtain a strong screw connection between such threaded members even though one of the members is made of a relatively soft material, and also results in an advantage of tremendous practical importance because existing conventional threading dies, taps and other tools can be used in forming the threads on the members which are to be connected by the insert.

Other objects and advantages of the invention will be apparent from the following description when taken in conjunction with the accompanying sheet of drawings in which, Fig. 1 is a sectional view taken through a threaded connection made according to the present invention and in which substantially equal portions or amounts of the wire of the insert extend into the thread grooves of the members connected by the insert;

Fig. 2 is a longitudinal sectional view taken through the connecting insert or bushing;

Fig. 3 is an end view thereof; and

Figs. 4 and 5 are partial longitudinal sectional views taken through other threaded connections made according to the present invention but in which unequal portions of the wire of the insert extend into the thread grooves of the members connected by the insert.

More detailed reference will now be made to the accompanying drawings wherein I have illustrated one form of my novel insert or bushing and show threaded connections in which this insert is used. My novel insert can be used for a variety of practical purposes, for example, it can be used in bodies of relatively soft material for receiving a screw or stud and, when so used, provides a stronger connection than if the screw or stud were screwed directly into such material. This insert can also be used as a bushing or adapter in any bodies or materials where it is desirable to connect internally and externally threaded members having standard or conventional threads of the same pitch but of different nominal diameters.

In Fig. 1 I show a threaded connection comprising a pair of internally and externally threaded members 10 and 11 and in which my novel insert 12 is disposed between such members and forms a connection therebetween. In this instance the externally threaded member 11 is in the form of a screw having a head 11a and a threaded stem 11b. The internally threaded or female member 10 may be any body with which an externally threaded member is to be connected such as a body of aluminum, steel, wood, fiber, plastic or the like. In this instance I show the screw 11 being used to connect a plate or other part 13 to the member 10.

The insert 12 is in the form of a bushing or sleeve comprising a number of turns or convolutions of helically wound wire. One end of the wire may be deflected to extend substantially diametrically across the insert as shown in Figs. 2 and 3 to form a transverse bar or tang 14 to which a suitable tool or wrench may be applied for screwing the insert into the internally threaded or female member 10. The wire from which the insert 12 is formed may be made of steel or any other suitable metal or alloy and preferably is resilient in character and of a tensile strength such that the insert will be tough and strong and will retain its shape while being screwed into the threaded opening.

An important feature of the present invention resides in the fact that the insert 12 is made of wire of a cross-sectional shape such that the members to be connected by the insert can have threads of a standard or conventional form which permits these members to be threaded by conventional taps and dies which are already available and are standard equipment in most manufacturing plants. As shown in Fig. 1, the internally threaded or female member 10 is provided with a substantially cylindrical opening 10a having therein the helical thread 10b which may be of a conventional American National form. The externally threaded or male member 11 has thereon a similar thread 11c of a conventional American National form and which is of the same pitch as the thread 10b but of a smaller nominal diameter. For example, the thread 11c of the member 11 may be a $\frac{5}{16}$"-24 thread and the thread 10b may be a $\frac{3}{8}$"-24 thread. As shown in Fig. 1 of the drawing, the external and internal diameters of the male and female members are held substantially to the diameters which are conventional for the American National threads provided on these members.

The wire from which the bushing 12 is made is of a cross-sectional shape such that the insert has external and internal conventional American National form threads 12a and 12b thereon which will extend into and substantially fill the thread grooves of the internally and externally threaded members 10 and 11. By using a double-edged wire of substantially diamond cross-sectional shape, I am able to obtain an insert having the external and internal threads 12a and 12b of the desired form thereon. Since standard or conventional threads, such as the threads 10b and 11c, usually have a 60° included angle, the cross-sectional shape of the wire for the insert 12 is preferably such that the threads 12a and 12b also have a 60° included angle. The wire of the insert 12 is wound to the same pitch as the pitch of the threads 10b and 11b and the diameter of the insert and the thickness of the wire are such that the external thread 12a of the insert will conform substantially to the thread 10b of the member 10 and the internal thread 12b of the insert will conform substantially to the external thread 11c of the member 11. In other words, for the above example, the insert 12 would have a $\tfrac{7}{16}''$-24 internal thread and a $\tfrac{3}{8}''$-24 external thread. My invention also contemplates a screw series in which the above-described insert would be furnished in sizes to serve pairs of internally and externally threaded members having standard or conventional threads of the same pitch but of different nominal diameters.

In forming a threaded connection using my novel insert 12, the female member 10 is tapped, or drilled and tapped as the case may be, to provide the standard or conventional thread 10b therein. The insert 12 is then screwed into the threaded opening 10a by means of a tool or wrench which engages the bar or tang 14 of the insert. The threaded portion of the male member 11 is then screwed into the insert and thereafter the insert forms a connecting element between the two threaded members.

In the threaded connection shown in Fig. 1, substantially equal portions of the wire extend into the thread grooves of the members 10 and 11 being connected by the insert. In some instances, however, the portions of wire extending into the threads of the connected members are unequal as shown in Figs. 4 and 5. In Fig. 4 an insert 15, similar to the insert 12, connects internally and externally threaded members 16 and 17 which have standard or conventional threads 16a and 17a. In the connection here shown one-half of the wire of the insert extends into the thread grooves of the member 17 while a little less than one-half of the wire of the insert extends into the thread grooves of the member 16. This condition would occur for certain combinations of threaded male and female members for example when the male member 17 has a $\tfrac{5}{8}''$-18 thread and the female member 16 has a $\tfrac{9}{16}''$-18 thread.

In Fig. 5 an insert 18, which is similar to the insert 12, connects internally and externally threaded members 19 and 20 with nearly one-half of the wire of the insert extending into the thread grooves of the member 20 and somewhat less than one-half extending into the thread grooves of the member 19. The condition here represented would occur for certain combinations of male and female members such as when the male member 20 has a $1''$-14 thread and the female member 19 has a $\tfrac{7}{8}''$-14 thread.

In all cases however, the threads of the insert substantially fill the thread grooves of the members which are connected by the insert and a strong and reliable connection can thus be provided between various members to be connected.

From the foregoing description and accompanying drawing, it will now be readily understood that I have provided a novel insert which can be used for a variety of practical purposes and with which a strong and reliable connection can be formed. It will be seen furthermore that by using a wire of diamond cross-sectional shape for the insert, the threads thereof will be of a shape to substantially fill the thread grooves of the members to be connected and such members can have standard or conventional threads and hence can be threaded by the use of existing taps and dies.

While I have illustrated and described my novel insert and threaded connection in more or less detail, it will be understood of course that I do not wish to be limited to the particular features and details herein described but regard my invention as including all changes and modifications coming within the spirit of the invention and the scope of the appended claim.

Having thus described my invention, I claim:

An insert made of helically coiled wire and adapted to form a screw connection between threaded portions of a pair of male and female members, the threaded portion of said male member having thereon an external thread of a conventional American National form and pitch and the threaded portion of said female member also having thereon an internal thread of a conventional American National form and pitch, the external and internal diameters of said male and female members being held to the diameters which are conventional for the American National threads thereon, said helically coiled wire having a cross-sectional shape and pitch such that the insert has internal and external threads of said conventional American National form and pitch so as to permit the use of existing conventional threading tools in forming the threads on the threaded portions of the male and female members to be connected by said insert

HOWARD J. FINDLEY.